United States Patent
Park et al.

(10) Patent No.: US 9,839,898 B2
(45) Date of Patent: Dec. 12, 2017

(54) FUEL PROCESSOR

(71) Applicants: Dal Ryung Park, Gyeonggi-do (KR); Bong Gyu Kim, Gyeonggi-Do (KR); Jae Dong Kim, Gyeonggi-Do (KR); Jin Wook Kim, Gyeonggi-Do (KR); Keun Yong Cho, Gyeonggi-Do (KR); Chul Hee Jeon, Gyeonggi-Do (KR); Min Ho Bae, Gyeonggi-Do (KR); Chan Sik Park, Gyeonggi-Do (KR)

(72) Inventors: Dal Ryung Park, Gyeonggi-do (KR); Bong Gyu Kim, Gyeonggi-Do (KR); Jae Dong Kim, Gyeonggi-Do (KR); Jin Wook Kim, Gyeonggi-Do (KR); Keun Yong Cho, Gyeonggi-Do (KR); Chul Hee Jeon, Gyeonggi-Do (KR); Min Ho Bae, Gyeonggi-Do (KR); Chan Sik Park, Gyeonggi-Do (KR)

(73) Assignees: Korea Gas Corporation, Daegu (KR); CHP Tech, Gyeonggi-Do (KR)

( * ) Notice: Subject to any disclaimer, the term of this patent is extended or adjusted under 35 U.S.C. 154(b) by 141 days.

(21) Appl. No.: 15/010,423

(22) Filed: Jan. 29, 2016

(65) Prior Publication Data
US 2016/0236166 A1 Aug. 18, 2016

(30) Foreign Application Priority Data

Feb. 16, 2015 (KR) .................. 10-2015-0023166

(51) Int. Cl.
*C01B 3/38* (2006.01)
*C01B 3/48* (2006.01)
(Continued)

(52) U.S. Cl.
CPC .......... *B01J 19/245* (2013.01); *B01J 8/0469* (2013.01); *B01J 8/0473* (2013.01); *B01J 8/0496* (2013.01);
(Continued)

(58) Field of Classification Search
CPC .................... C01B 2203/0288; C01B 2203/82
See application file for complete search history.

(56) References Cited

U.S. PATENT DOCUMENTS 5,458,857 A * 10/1995 Collins .................. B01J 8/0449
422/198
6,126,908 A * 10/2000 Clawson ................ B01J 8/0278
422/198
(Continued)

*Primary Examiner* — Matthew J Merkling
(74) *Attorney, Agent, or Firm* — Tarolli, Sundheim, Covell & Tummino LLP

(57) ABSTRACT

Disclosed is a fuel processor. The fuel processor includes: a steam reformer unit configured to be disposed at an upper portion in a casing; a heat exchanger unit configured to be disposed at a lower portion of the steam reformer unit; a high temperature shift reforming unit configured to be disposed at a lower portion of the heat exchanger unit; a low temperature shift reforming unit configured to be disposed while enclosing an outer portion of the high temperature shift reforming unit; and a heat exchange chamber configured to be disposed at a lower portion of the high temperature shift reforming unit and exchange heat between reformed gas and a heat exchange fluid supplied through a channel part formed to drain the reformed gas and combustion gas and supply the heat exchange fluid.

14 Claims, 6 Drawing Sheets

(51) Int. Cl.
*B01J 19/00* (2006.01)
*B01J 19/24* (2006.01)
*B01J 8/04* (2006.01)

(52) U.S. Cl.
CPC .................. *C01B 3/38* (2013.01); *C01B 3/48* (2013.01); *B01J 2208/00185* (2013.01); *B01J 2208/00194* (2013.01); *B01J 2208/00203* (2013.01); *B01J 2208/00504* (2013.01); *B01J 2219/0009* (2013.01); *B01J 2219/00078* (2013.01); *B01J 2219/00081* (2013.01); *B01J 2219/00083* (2013.01); *B01J 2219/00092* (2013.01); *B01J 2219/00094* (2013.01); *B01J 2219/00157* (2013.01); *B01J 2219/24* (2013.01); *C01B 2203/0233* (2013.01); *C01B 2203/0288* (2013.01); *C01B 2203/0495* (2013.01); *C01B 2203/0816* (2013.01); *Y02P 20/124* (2015.11)

(56) References Cited

U.S. PATENT DOCUMENTS

| | | | |
|---|---|---|---|
| 6,238,815 B1 * | 5/2001 | Skala | B01J 8/048 422/200 |
| 6,245,303 B1 * | 6/2001 | Bentley | B01J 8/0411 422/198 |
| 6,413,479 B1 * | 7/2002 | Kudo | B01J 8/0465 208/133 |
| 6,506,359 B1 * | 1/2003 | Maruko | B01J 8/0484 423/648.1 |
| 6,521,204 B1 * | 2/2003 | Borup | B01B 1/005 423/651 |
| 6,524,550 B1 * | 2/2003 | Chintawar | B01J 8/04 423/650 |
| 6,713,040 B2 * | 3/2004 | Ahmed | B01J 8/0465 423/652 |
| 6,936,238 B2 * | 8/2005 | Sennoun | B01B 1/005 422/198 |
| 6,986,797 B1 * | 1/2006 | Clawson | B01J 19/0013 122/4 D |
| 7,037,472 B2 * | 5/2006 | Komiya | H01M 8/0631 422/204 |
| 7,066,973 B1 * | 6/2006 | Bentley | B01J 8/0465 422/198 |
| 7,156,886 B2 * | 1/2007 | Nakamura | B01B 1/005 422/198 |
| 7,182,921 B2 * | 2/2007 | Miura | B01J 8/0465 422/129 |
| 7,198,862 B2 * | 4/2007 | Baumann | B01D 53/8603 423/652 |
| 7,494,516 B2 * | 2/2009 | Reinke | B01B 1/005 48/127.9 |
| 7,625,414 B2 * | 12/2009 | Nougier | B01J 8/0221 422/198 |
| 7,887,606 B2 * | 2/2011 | Mizusawa | B01J 8/0469 423/648.1 |
| 8,178,062 B2 * | 5/2012 | Fuju | C01B 3/384 422/625 |
| 8,404,007 B2 * | 3/2013 | Matsuda | C01B 3/384 422/620 |
| 8,747,496 B2 * | 6/2014 | Neels | B01F 5/0268 422/168 |
| 9,012,098 B2 * | 4/2015 | Goto | C01B 3/384 422/162 |
| 9,240,604 B2 * | 1/2016 | Maenishi | C01B 3/384 |
| 9,312,554 B2 * | 4/2016 | Kita | B01J 8/0465 |
| 2002/0152681 A1 * | 10/2002 | Oh | B01B 1/005 48/127.9 |
| 2003/0136051 A1 * | 7/2003 | Sevenhuijsen | B01B 1/005 48/127.9 |
| 2005/0172553 A1 * | 8/2005 | Zartenar | B01D 53/864 48/127.9 |
| 2013/0065144 A1 * | 3/2013 | Hashimoto | C01B 3/38 429/425 |
| 2014/0065500 A1 * | 3/2014 | Hong | C01B 3/384 429/415 |

* cited by examiner

FUEL PROCESSOR

CROSS-REFERENCE TO RELATED APPLICATION(S)

This application claims priority to Korean Patent Application No(s). 10-2015-0023166, filed on Feb. 16, 2015, the disclosure(s) of which is (are) incorporated herein by reference in its (their) entirety.

BACKGROUND OF THE INVENTION

Field of the Invention

Exemplary embodiments of the present invention relate to a fuel processor used to shift natural gas to reformed gas easily supplied to a fuel cell stack, and more particularly, to a fuel processor including a burner unit disposed to vertically down high temperature flame generated from a burner to improve reaction time and temperature of a steam reforming unit and thermal efficiency of a heat exchanger unit.

Description of the Related Art

Generally, a fuel processor is configured to include a steam reformer shifting natural gas to hydrogen using steam reforming, high temperature shift and low temperature shift (HTS, LTS) reformers 이하 반응기는 모두 reformer 로 기재하였습니다., shifting carbon monoxide generated together with hydrogen into carbon dioxide, and a burner supplying a heat quantity.

That is, main components of the natural gas are methane (CH4) and react to steam in the steam reformer to generate hydrogen and carbon monoxide. In this case, the reaction temperature generally ranges from about 650 to 700□C. and the reaction is endothermic reaction and therefore the heat quantity required for the reaction is supplied by the burner.

When the carbon monoxide generated together with the hydrogen is introduced into a fuel cell stack, the fuel cell stack is poisoned and performance of the fuel cell stack is thus adversely affected. To remove the carbon monoxide, the carbon monoxide is shifted to the carbon dioxide by the high temperature shift (HTS) reformer and the low temperature shift (LTS) reformer.

The shift reaction temperature of the HTS and the LTS generally ranges from about 300 to 350□C. in the case of the high temperature shift reformer and about 180 to 250□C. in the case of the low temperature shift reformer, and the shift reaction diffuses heat at the time of the reaction by exothermic reaction.

The burner is positioned in a combustion chamber of the fuel processor to perform combustion and combustion exhaust gas generated during the combustion process ascends toward a top layer of the fuel processor and then passes through a channel between a catalytic reformer and the combustion chamber from top to bottom to supply heat to the catalytic reformer.

As described above, the existing fuel processor separately uses the reformer by being divided into the steam reformer and the shift reformer. In this case, the steam reformer uses the endothermic reaction and the shift reformer uses the exothermic reaction and therefore the steam reformer and the shift reformer have different thermal gradients and a large difference in reaction temperature. Therefore, the steam reformer and the shift reformer are separately manufactured, such that the internal structure and the channel may be complicated and the entire volume of the reformer may be increased.

RELATED ART DOCUMENT

Patent Document (Patent Document 1) US Patent Laid-Open Publication No. US2014/0065500 A1

SUMMARY OF THE INVENTION

An object of the present invention relates to a fuel processor capable of changing dispositions of a steam reformer unit, a heat exchanger unit, a high temperature shift reforming unit, and a low temperature shift reforming unit which are used to generate reformed gas and improving heat exchange efficiency through a heat exchange chamber.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a fuel processor includes: a steam reformer unit configured to be disposed at an upper portion in a casing; a heat exchanger unit configured to be disposed at a lower portion of the steam reformer unit; a high temperature shift reforming unit configured to be disposed at a lower portion of the heat exchanger unit; a low temperature shift reforming unit configured to be disposed while enclosing an outer portion of the high temperature shift reforming unit; and a heat exchange chamber configured to be disposed at a lower portion of the high temperature shift reforming unit and exchange heat between reformed gas and a heat exchange fluid supplied through a channel part formed to drain the reformed gas and combustion gas and supply the heat exchange fluid.

The steam reformer unit may include: a burner housing configured to be inserted from a center of an upper portion of the casing and extending in a length direction; a burner unit configured to be installed at an upper portion in the burner housing and generating flame downward from the upper portion of the casing; and a steam reforming unit configured to form the burner housing as a concentric circle and has a reaction catalyst formed therein.

The burner housing may extend relatively shorter than a lower end of the steam reforming unit.

The steam reforming unit may have a thickness decreasing toward a radial direction of the casing.

The steam reforming unit may be formed between unit steam reforming units, respectively, in a length direction of the casing and may be provided with a channel through which steam moves.

The fuel processor may further include: a steam heating chamber configured to be disposed to face the lower portion of the steam reformer unit and be provided with an opening into which high temperature flame generated at the burner unit is introduced to stay steam heated by the burner unit therein for a predetermined time without directly moving the steam to the steam reforming unit after the steam is introduced through the opening.

The steam heating chamber may further include an extending pipe configured to extend toward the steam reforming unit along a circumferential direction.

The steam reformer unit may further include a condensed water storage chamber configured to store condensed water generated by exchanging heat with the steam supplied to the steam reforming unit.

The condensed water storage chamber may be disposed at a lower portion of the steam heating chamber.

The heat exchanger unit may include: an air inlet configured to extend from an outer side of the heat exchanger unit to an inner side thereof to be supplied with outer air so as to supply high temperature heating air to the burner unit; and an air outlet configured to extend from the inner side of the heat exchanger unit to the outer side thereof while being upwardly spaced apart from the air inlet to supply the outer air introduced through the air inlet to the burner unit after the outer air is heat-exchanged with the steam.

The heat exchanger unit may be a shell and tube type.

The reformed gas moving to the heat exchanger unit may fall to a predetermined temperature by exchanging heat with the outer air supplied through the air inlet.

In accordance with another aspect of the present invention, a fuel processor includes: a steam reformer unit configured to be disposed at an upper portion in a casing; a heat exchanger unit configured to be disposed at a lower portion of the steam reformer unit; a high temperature shift reforming unit configured to be disposed at a lower portion of the heat exchanger unit; a low temperature shift reforming unit configured to be disposed while enclosing an outer portion of the high temperature shift reforming unit; a heat exchange coil unit configured to be disposed between the high temperature shift reforming unit and the low temperature shift reforming unit and have a fluid for heat exchange supplied to an inside thereof to prevent the high temperature shift reforming unit from overheating; and a heat exchange chamber configured to be disposed at a lower portion of the high temperature shift reforming unit and exchange heat between reformed gas and a heat exchange fluid supplied through a channel part formed to drain the reformed gas and combustion gas and supply the heat exchange fluid.

The heat exchange chamber may enclose a reformed gas channel part through which the reformed gas moves.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
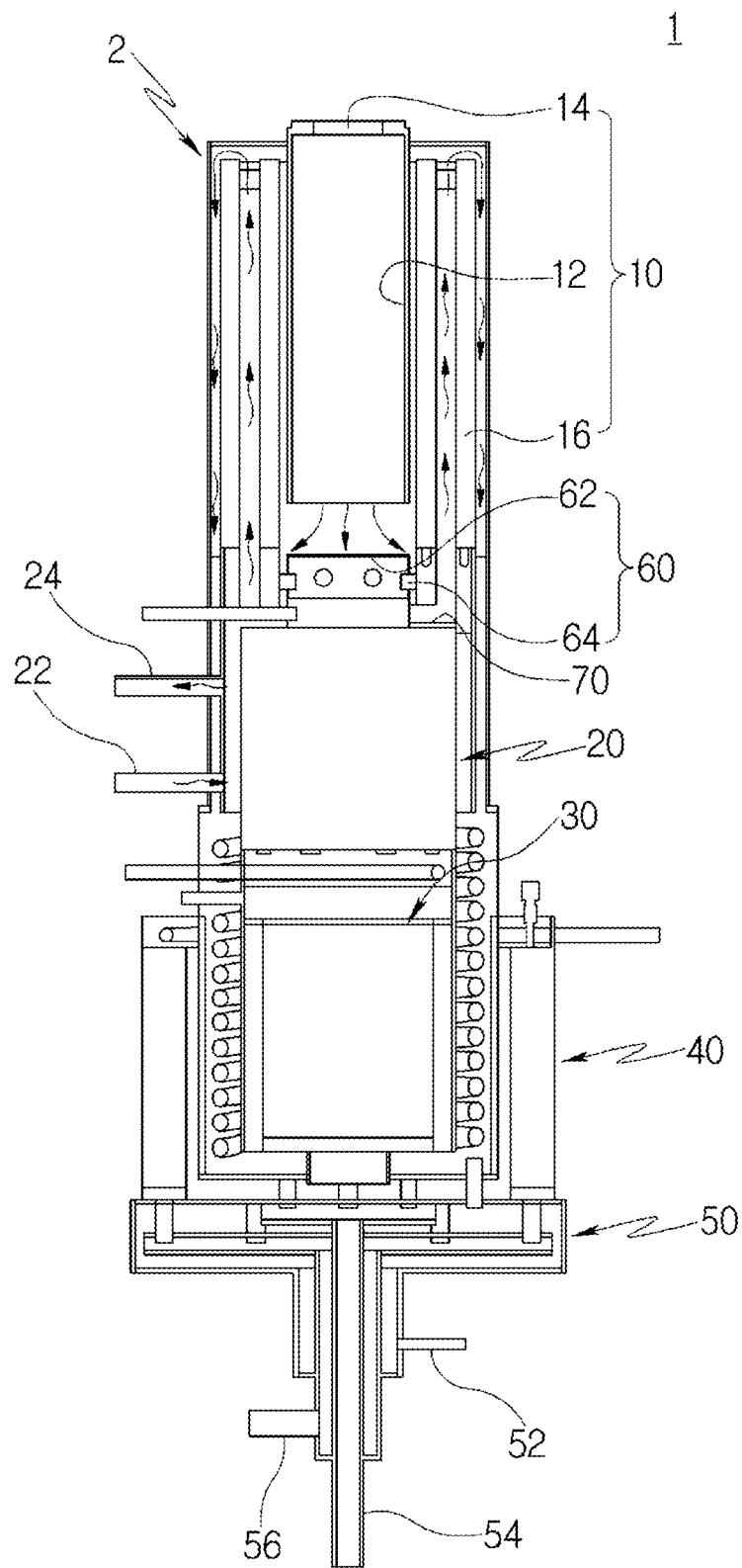
FIG. 1 is a longitudinal cross-sectional view of a fuel processor according to a first embodiment of the present invention.

A fuel processor according to a first exemplary embodiment of the present invention will be described with reference to the accompanying drawings. FIG. 1 is a longitudinal cross-sectional view of a fuel processor according to a first embodiment of the present invention, FIG. 2 is a traversal cross-sectional view of a steam reformer unit according to a first exemplary embodiment of the present invention, and FIG. 3 is a diagram illustrating a temperature distribution simulation according to an operating state of a burner unit of the fuel processor according to the first exemplary embodiment of the present invention.

Figure 2:
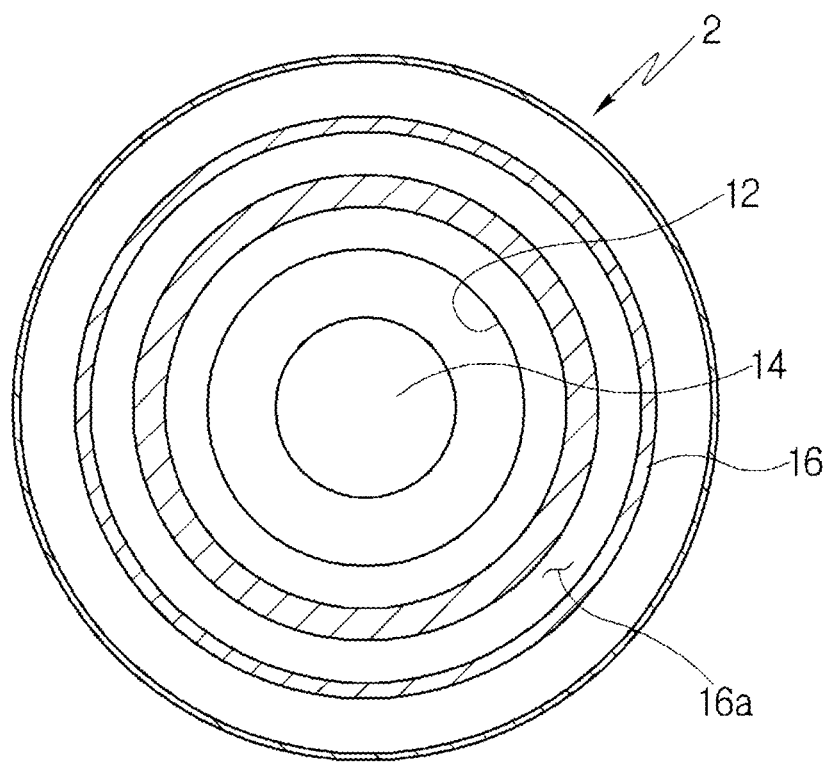
FIG. 2 is a traversal cross-sectional view of a steam reformer unit according to a first exemplary embodiment of the present invention.
Figure 3:
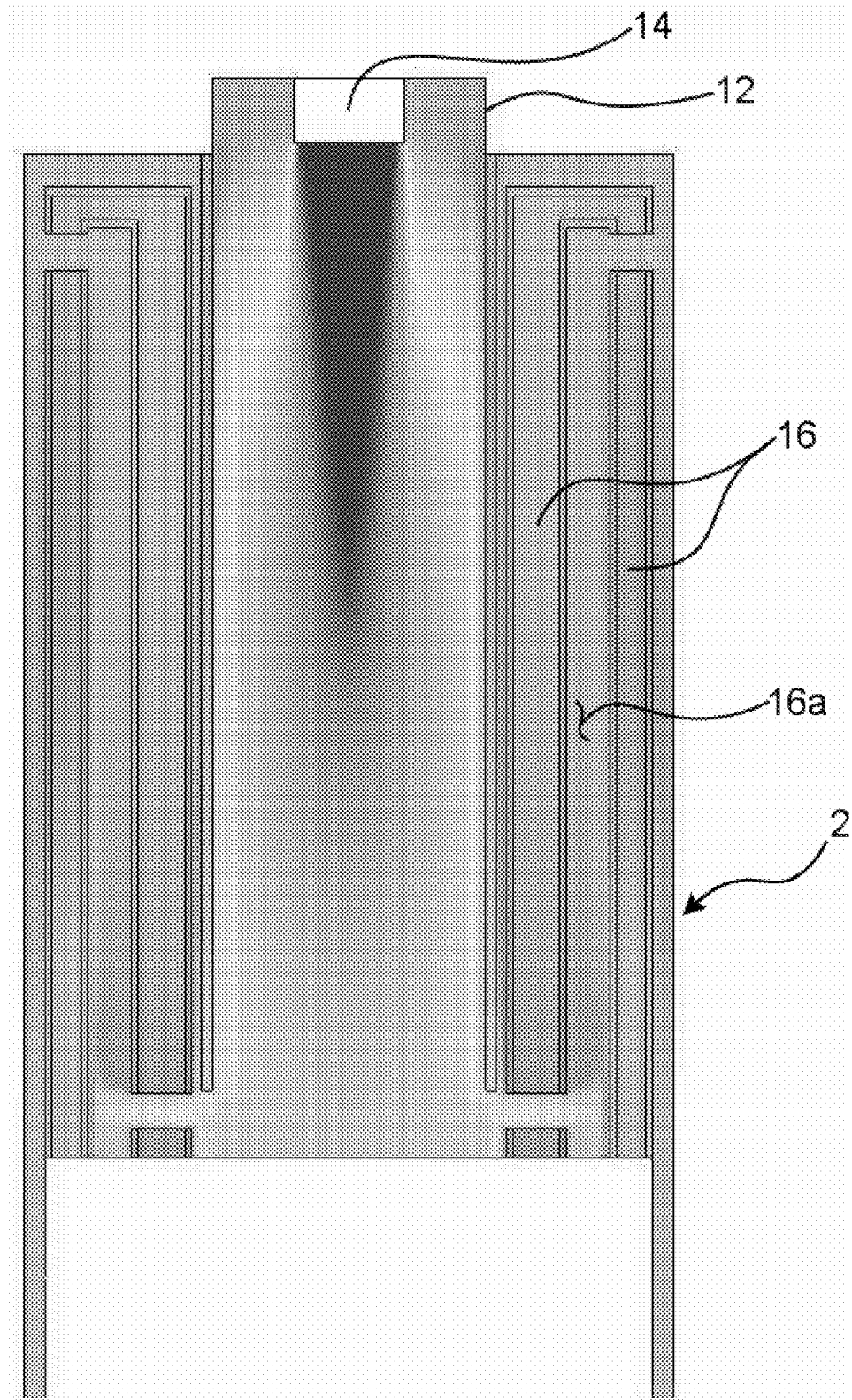
FIG. 3 is a diagram illustrating a temperature distribution simulation according to an operating state of a burner unit of the fuel processor according to the first exemplary embodiment of the present invention.

Referring to the accompanying FIGS. 1 to 3, a fuel processor 1 according to a first exemplary embodiment of the present invention includes a steam reformer unit 10 configured to be disposed at an upper portion in a casing 2, a heat exchanger unit 20 configured to be disposed at a lower portion of the steam reformer unit 10, a high temperature shift reforming unit 30 configured to be disposed at a lower portion of the heat exchanger unit 20, a low temperature shift reforming unit 40 configured to be disposed while enclosing an outer portion of the high temperature shift reforming unit 30, and a heat exchange chamber 50 configured to be disposed at a lower portion of the high temperature shift reforming unit 30 and exchange heat between reformed gas and a heat exchange fluid supplied through a channel part 52 formed to drain the reformed gas and combustion gas and supply the heat exchange fluid.

The steam reformer unit 10 according to the exemplary embodiment of the present invention includes a burner housing 12 configured to be inserted from a center of an upper portion of the casing 2 and extending in a length direction, a burner unit 14 configured to be installed at an upper portion in the burner housing 12 and generating flame downwardly from the upper portion of the casing 2, and a steam reforming unit 16 configured to form the burner housing 12 as a concentric circle and has a reaction catalyst formed therein.

The casing 2 is formed in a cylindrical shape and the burner unit 14 is installed at an upper end of the burner housing 12. The reason why the burner unit 14 is installed at the upper end of the burner housing 12 is that an extension length in a length direction of the steam reformer unit 10 is relatively shorter, such that the burner housing 120 may be miniaturized to minimize constraints due to a layout of an installation space and improve installation convenience.

Referring to the accompanying FIG. 3, when the burner unit 14 is operated, the generated high temperature flame moves along the length direction of the burner housing 12 and is concentrated on the lower end of the burner housing 12, such that a heat loss to the outer portion of the casing 2 may be minimized and a larger amount of steam may be supplied to the steam reforming unit 16 positioned at the outer portion of the burner housing 12, thereby improving a catalyst reaction of the steam reforming unit 16. As a result, faster starting may be implemented to shorten an operating time and maintain temperature atmosphere under which the reforming reaction may be stably made in the steam reforming unit 16.

The burner housing 12 may extend relatively shorter than the lower end of the steam reforming unit 16. In this case, the reaction catalyst is heated at a predetermined temperature while the steam heated by the flame generated from the burner unit 14 is diffused to the steam reformer 16 as illustrated by an arrow.

The steam reforming unit 16 forms the burner housing 12 as the concentric circle and is provided with a plurality of unit steam reforming units having a diameter increasing in a radial direction of the casing 2, in which the unit steam reforming unit has the diameter increasing in the radial direction of the casing 2 but a thickness decreasing in the radial direction of the casing 2 and therefore a reaction catalyst amount is decreased but a contact area with steam is increased, such that the reforming reaction may be stably made.

In particular, the reaction catalyst disposed in the steam reforming unit 16 exchanges heat with the steam heated at a high temperature state and in a dried state without directly contacting the flame generated from the burner unit 14, such that the durability of the reaction catalyst may be improved and the reaction catalyst may be stably used even when it is used for a long period of time.

The steam reforming unit 16 is formed between the unit steam reforming units, respectively, in the length direction of the casing 2 and is provided with a passage 16a through which the steam moves. The steam moves in a direction shown by an arrow through the passage 16a, the high temperature steam moves upward from a lower portion in the length direction of the steam reforming unit 16 at the lower end of the burner housing 12, and the reforming reaction is made by exchanging heat with the reaction catalyst while again moving downwardly from the upper portion of the steam reforming unit 16.

Further, the steam heating chamber 60 is disposed to face the lower portion of the steam reformer unit 10 and is provided with an opening 62 into which the high temperature flame generated from the burner unit 14, such that the steam heated by the burner unit 14 may be introduced through the opening 62 and then may not directly move toward the steam reforming unit 16. Therefore, the steam stays in the steam heating chamber 60 for a predetermined time and then moves, such that the heat exchange time may be stably secured.

The steam heating chamber 60 is disposed to face the burner housing 12 and an upper surface of the steam heating chamber 60 is provided with the opening 62 through which the flame or the steam is introduced and is provided with a plurality of extending pipes 64 extending toward the steam reforming unit 16 along a circumferential direction, such that the high temperature steam may stably move toward the steam reforming unit 16 through the extending pipes 64.

In particular, the extending pipes 64 are radially disposed in the steam heating chamber 60, such that a large amount of steam may be stably supplied to the lower end of the steam reforming unit 16 having a pipe shape. For reference, an internal temperature of the steam heating chamber 60 is maintained at a high temperature condition of 700□C. or more.

The steam reformer unit 10 may further include a condensed water storage chamber 70 configured to store condensed water generated by exchanging heat with the steam supplied to the steam reforming unit 16. The condensed water storage chamber 70 does not separately drain the condensed water generated depending on a change in temperature after the steam is heated but stores the condensed water in the state in which it is collected in the condensed water storage chamber 70.

The stored condensed water is not maintained in the collected state due to the high temperature flame or the high temperature steam generated from the burner unit 14 but is evaporated due to the high temperature simultaneously with the operation of the burner unit 14.

Therefore, the condensed water may be easily evaporated and removed by the operation of the buffer unit 14 or the high temperature atmosphere maintained in the steam reformer unit 10 without forming a separate drain passage through which the condensed water is drained to the outside of the fuel processor 1, such that the problem due to the condensed water does not occur.

The condensed water storage chamber 70 disposed at the lower portion of the steam heating chamber 60. The reason why the condensed water storage chamber 70 is disposed at the lower portion of the steam heating chamber 60 is to sore the condensed water which may be drained through the extending pipe 64 extending from the steam heating chamber 60 toward the steam reforming unit 16 and the condensed water storage chamber 70 is spaced apart from the lower end of the steam reforming unit 16 at a predetermined interval or more, such that a malfunction of the reaction catalyst due to the condensed water may be previously prevented. The heat exchanger unit 20 has a cylindrical appearance and is a shell and tube type. Water which is a fluid moves to the tube and the heat exchange between the tube and the shell is made while the reformed gas relatively moves to each other in the shell.

The heat exchanger unit 20 includes an air inlet 22 configured to extend from an outer side of the heat exchanger unit 20 to an inner side thereof to be supplied with outer air so as to supply high temperature heating air to the burner unit 14; and an air outlet 24 configured to extend from the inner side of the heat exchanger unit 20 to the outer side thereof while being upwardly spaced apart from the air inlet 22 to supply the outer air introduced through the air inlet 22 to the burner unit 14 after the outer air is heat-exchanged with the steam.

The reformed gas moving to the heat exchanger unit 20 moves to the high temperature shift reforming unit 30 to be described below in the state in which temperature of initial reformed gas generated due to the high temperature steam in the foregoing steam reformer unit 10 is in a high temperature state of about 700□C. but falls to a temperature of 600□C. or less when the reformed gas passes through the heat exchanger unit 20, such that the temperature of the reformed gas may stably fall. Further, the temperature of the reformed gas is previously controlled to the temperature at which the reaction is stably maintained in the high temperature shift reforming unit 30 to be described below to improve the efficiency of the high temperature shift reforming unit 30.

The outer air introduced into the air inlet 22 is supplied to the burner unit 14 through the air outlet 24 after the outer air is heat-exchanged with the high temperature reformed gas formed around the heat exchanger unit 20. The air supplied to the burner unit 14 is supplied to the burner unit 14 while being maintained at the relatively high temperature and thus has a high flash point, such that the combustion state may be stably maintained and thus the temperature of the steam reformer 16 may be maintained at an optimum temperature.

In particular, the heat exchanger unit 20 may lower the temperature of the exhaust gas generated from the burner unit 14 and the reformed gas generated after reaction in the steam reforming unit 16 to maintain the carbon monoxide included in the reformed gas supplied to the stack at a reference value or less, thereby performing the heat exchange as described above.

The high temperature shift reforming unit 30 performs the heat exchange so that the reformed gas maintained at a temperature state of 600□C. in the heat exchanger unit 20 is maintained at a temperature of about 350□C.

The diameter of the low temperature shift reforming unit 40 is larger than that of the high temperature shift reforming unit 30, but the thickness thereof is a relatively thin and the low temperature shift reforming unit 40 is supplied with the reformed gas passing through the high temperature shift reforming unit 30 to react with a pellet catalyst positioned therein.

As the thickness of the low temperature shift reforming unit 40 is thin, catalyst utilization is improved while a contact between the reformed gas and the pellet catalyst is mostly performed and the pellet catalyst amount is relatively reduced to improve economical efficiency.

Further, the reformed gas falls to a temperature of about 250□C. while passing through the low temperature shift reforming unit 40 and a carbon monoxide amount is also reduced to a range of 0.2% to 0.5%.

The heat exchange chamber 50 is separately formed at the lower end of the case 2 and includes a channel part 52, in which the channel part 52 includes a first channel part 52 supplied with a fluid, a second channel part 54 extending outwardly from a center of the casing 2 to drain the exhaust gas generated from the burner unit 14, and a third channel part 56 draining the reformed gas.

Based on the second channel part 54 the third channel part 56 is disposed in the state in which it adheres to the second channel part 54 and the first channel part 52 is disposed to enclose the second channel part 54 and the third channel part 56 from the outside, such that the exhaust gas and the reformed gas in the relatively high temperature state are drained in the heat exchanged state by the fluid supplied through the first channel part 52 or are supplied to the stack, thereby exchanging heat with heat energy included in waste heat.

The fuel processor according to the first exemplary embodiment of the present invention may be used while being equipped in the fuel cell system, thereby stably producing hydrogen.

The fuel processor according to the first exemplary embodiment of the present invention is installed in a hydrogen charging system, in which the hydrogen charging system may be applied to all of a hybrid vehicle, a plant facility for producing hydrogen, and a small-scale hydrogen charging system.

The fuel processor according to the first exemplary embodiment of the present invention may be used while being installed in a hydrogen producing apparatus for a fuel cell system and may be used in a medium-large size or small-scale hydrogen producing apparatus.

A fuel processor according to a second exemplary embodiment of the present invention will be described with reference to the accompanying drawings.

Figure 4:
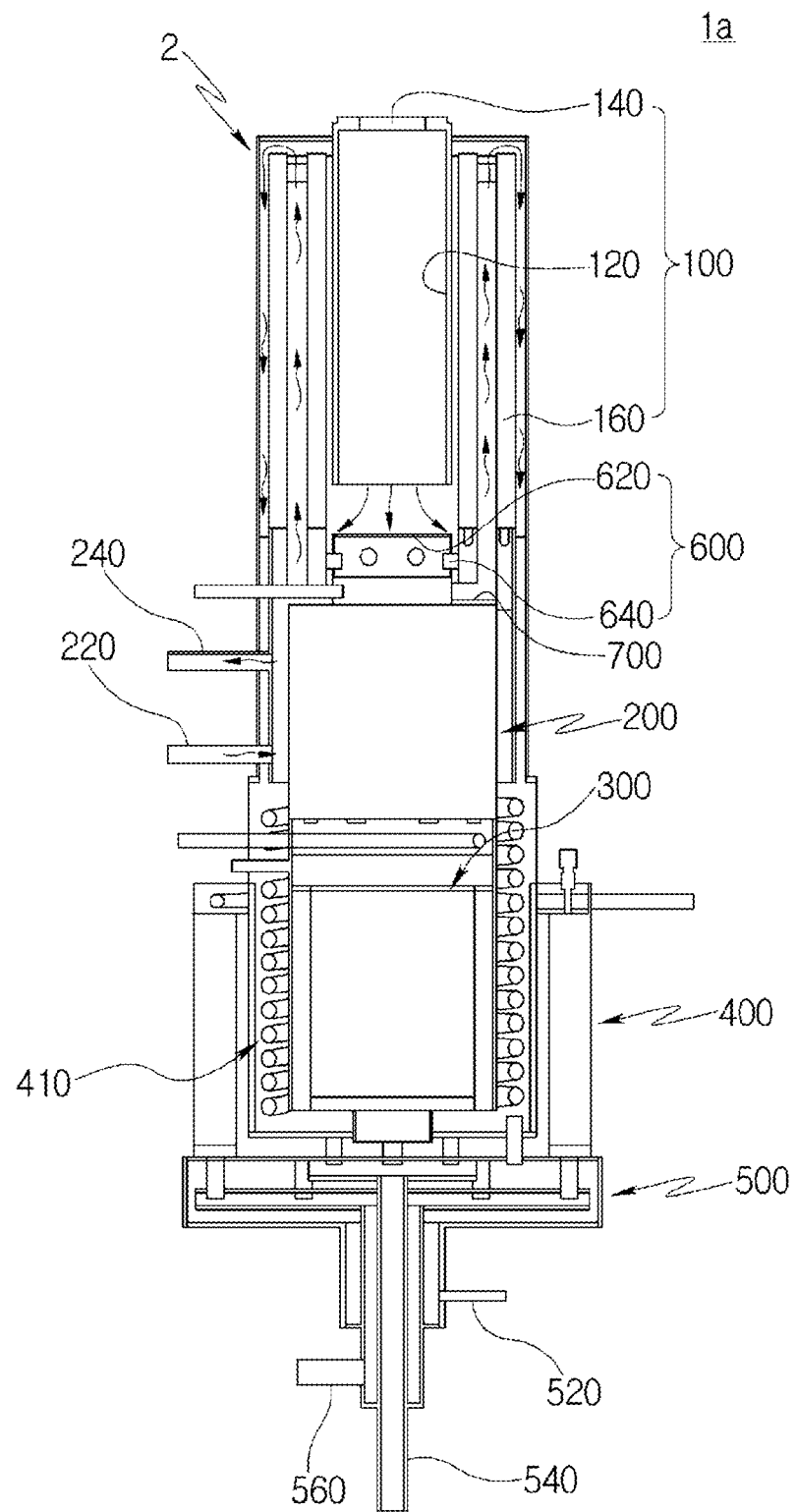
FIG. 4 is a longitudinal cross-sectional view of a fuel processor according to a second embodiment of the present invention.
Figure 5:
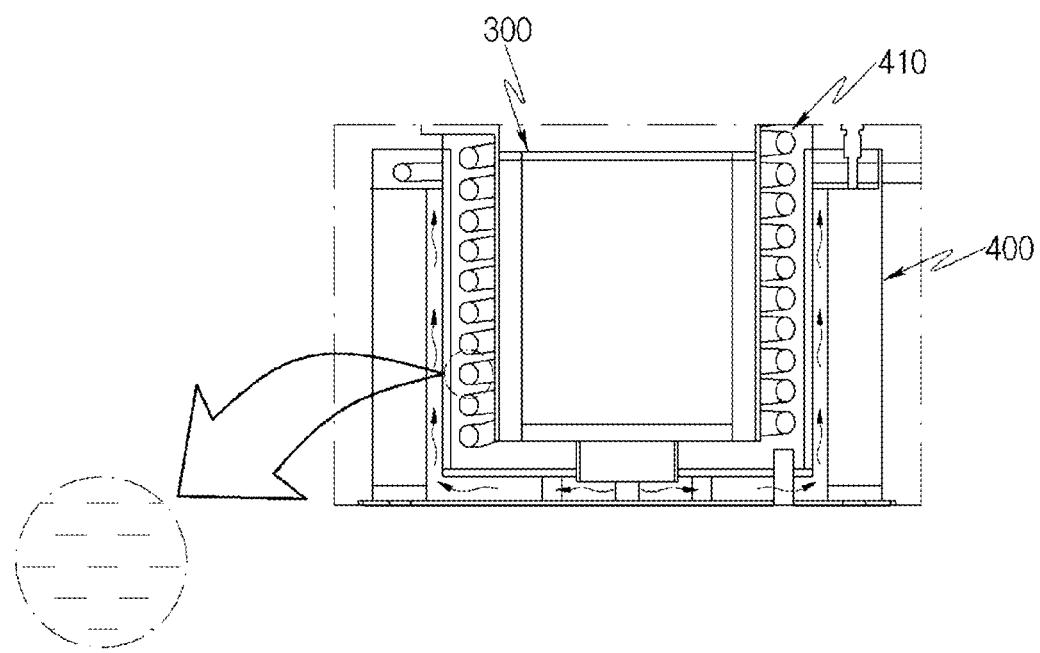
FIG. 5 is a longitudinal cross-sectional view of a heat exchange coil unit according to a second exemplary embodiment of the present invention.
Figure 6:
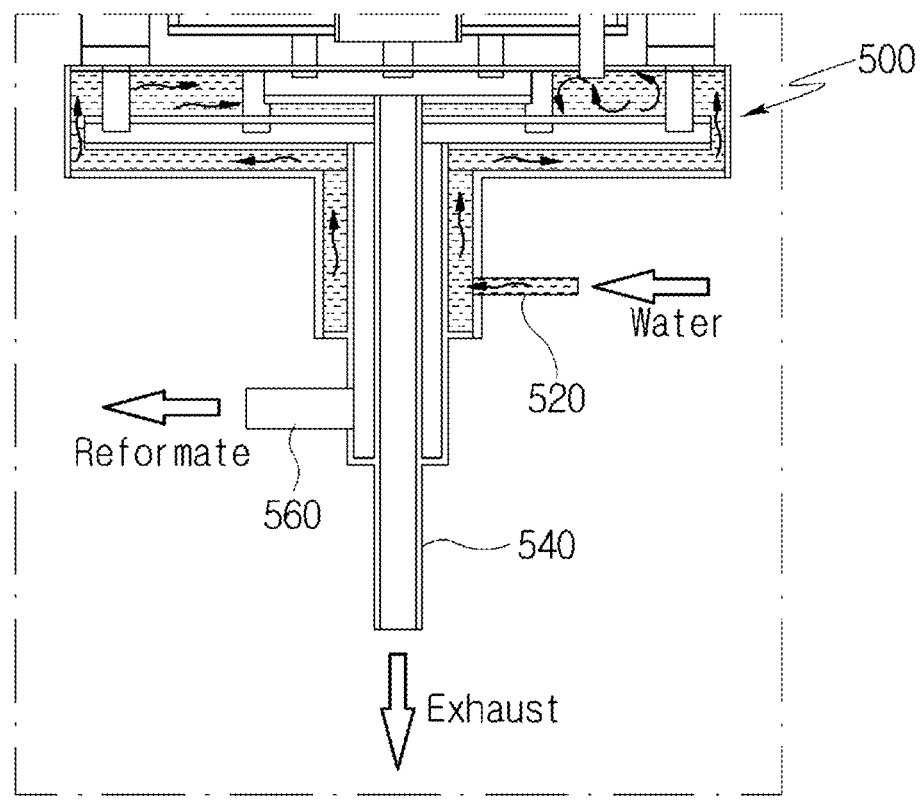
FIG. 6 is a cross-sectional view of a heat exchange chamber according to a second exemplary embodiment of the present invention.

Referring to the accompanying FIGS. 4 to 6, a fuel processor 1a according to a second exemplary embodiment of the present invention includes the steam reformer unit 100 configured to be disposed at the upper portion in a casing 2, the heat exchanger unit 200 configured to be disposed at the lower portion of the steam reformer unit 100, the high temperature shift reforming unit 300 configured to be disposed at the lower portion of the heat exchanger unit 200, a low temperature shift reforming unit 400 configured to be disposed while enclosing the outer portion of the high temperature shift reforming unit 300, a heat exchange coil unit 410 configured to be disposed between the high temperature shift reforming unit 300 and the low temperature shift reforming unit 400 and have the fluid for heat exchange supplied to an inside thereof to prevent the high temperature shift reforming unit 300 from overheating; and the heat exchange chamber 500 configured to be disposed at the lower portion of the high temperature shift reforming unit 300 and exchange heat between the reformed gas and the heat exchange fluid supplied through the channel part 520 formed to discharge the reformed gas and the combustion gas and supply the heat exchange fluid.

In particular, according to the exemplary embodiment of the present invention, the heat exchange coil unit 410 is disposed around the high temperature shift reforming unit 300 prevents the high temperature shift reforming unit 300 from overheating. By this configuration, even when the high temperature reformed gas is introduced by the fluid supplied to the heat exchange coil unit 410, the temperature of the high temperature shift reforming unit 300 is prevented from abnormally rising by the heat exchange.

When the high temperature shift reforming unit 300 rises to the high temperature, the content of the carbon monoxide included in the reformed gas may be increased and the low temperature shift reforming unit 400 may make the temperature of the high temperature shift reforming unit 300 fall to the additionally desired temperature, such that the heat exchange coil unit 410 preferably makes the temperature of the high temperature shift reforming unit 300 fall to the specific temperature.

Further, the heat exchange coil unit 410 needs to make the fluid used as the steam supplied to the steam reforming unit 160 rise to the high temperature, and therefore the high temperature shift reforming unit 300 make emit heat to make the temperature of the reformed gas fall and the heat exchange coil unit 410 may be used as an energy source which uses the high temperature heat emitted from the high temperature shift reforming unit 300 to generate the high temperature steam, thereby minimizing the energy loss through the heat exchange therebetween and improving the efficiency.

The steam reformer unit 100 according to the exemplary embodiment of the present invention includes a burner housing 120 configured to be inserted from the center of the upper portion of the casing 2 and extending in the length direction, the burner unit 140 configured to be installed at the upper portion in the burner housing 120 and generating flame downward from the upper portion of the casing 2, and the steam reforming unit 160 configured to form the burner housing 120 as the concentric circle and has the reaction catalyst formed therein.

The casing 2 is formed in a cylindrical shape and the burner unit 140 is installed at an upper end of the burner housing 120. The reason why the burner unit 140 is installed at the upper end of the burner housing 120 is that the extension length in the length direction of the steam reformer unit 100 is relatively shorter, such that the burner housing 120 may be miniaturized to minimize the constraints due to the layout of the installation space and improve the installation convenience.

Further, as illustrated in the drawings, when the burner unit 140 is operated, the generated high temperature flame moves along the length direction of the burner housing 120 and is concentrated on the lower end of the burner housing 120, such that the heat loss to the outer portion of the casing 2 may be minimized and the larger amount of steam may be supplied to the steam reforming unit 160 positioned at the outer portion of the burner housing 120, thereby improving the catalyst reaction of the steam reforming unit 160.

As a result, faster starting may be implemented to shorten the operating time and keep the temperature atmosphere under which the reforming reaction may be stably made in the steam reforming unit 160.

The burner housing 120 may extend relatively shorter than the lower end of the steam reforming unit 160. In this case, the reaction catalyst is heated at a predetermined temperature while the steam heated by the flame generated from the burner unit 140 is diffused to the steam reformer 160 as illustrated by an arrow.

The steam reforming unit 160 forms the burner housing 120 as the concentric circle and is provided with a plurality of unit steam reforming units having a diameter increasing in a radial direction of the casing 2, in which the unit steam reforming unit has the diameter increasing in the radial direction of the casing 2 but the thickness decreasing in the radial direction of the casing 2 and therefore the reaction catalyst amount is decreased but the contact area with steam is increased, such that the reforming reaction may be stably made.

In particular, the reaction catalyst disposed in the steam reforming unit 160 exchanges heat with the steam heated at the high temperature state and in the dried state without directly contacting the flame generated from the burner unit 140, such that the durability of the reaction catalyst may be improved and the reaction catalyst may be stably used even when it is used for a long period of time.

The steam reformer 160 is formed between the unit steam reformers, respectively, in the length direction of the casing 2 and is provided with the passage 16a (see FIG. 2) through which the steam moves. As illustrated by an arrow, the high temperature steam through the passage 16a moves upward from the lower portion in the length direction of the steam reforming unit 160 at the lower end of the burner housing 120, and the reforming reaction is made by exchanging heat with the reaction catalyst while again moving downwardly from the upper portion of the steam reforming unit 160.

The steam heating chamber 600 is disposed to face the lower portion of the steam reformer unit 100 and is provided with an opening 620 into which the high temperature flame generated from the burner unit 140 is introduced, such that the steam heated by the burner unit 140 may be introduced through the opening 620 and then may stay in the steam heating chamber 600 for a predetermined time without directly moving toward the steam reforming unit 160.

The steam heating chamber 600 is disposed to face the burner housing 120 and the upper surface of the steam heating chamber 600 is provided with the opening 620 through which the flame or the steam is introduced and is provided with the plurality of extending pipes 640 extending toward the steam reforming unit 160 along the circumferential direction, such that the high temperature steam may stably move toward the steam reforming unit 160 through the extending pipes 640.

In particular, the extending pipes 640 are radially disposed in the steam heating chamber 600, such that a large amount of steam may be stably supplied to the lower end of the steam reforming unit 160 having a pipe shape. For reference, an internal temperature of the steam heating chamber 600 is maintained at a high temperature condition of 700□C. or more.

The steam reformer unit 100 further includes a condensed water storage chamber 700 configured to store condensed water generated by exchanging heat with the steam supplied to the steam reforming unit 160, in which the condensed water storage chamber 700, in which the condensed water storage chamber 700 does not separately drain the condensed water generated depending on a change in temperature after the steam is heated but stores the condensed water in the state in which it is collected in the condensed water storage chamber 700 and the stored condensed water is not maintained in the collected state due to the high temperature flame or the high temperature steam generated from the burner unit 140 but is evaporated simultaneously with the operation of the burner unit 140.

Therefore, the condensed water may be easily evaporated and removed by the operation of the buffer unit 140 or the high temperature atmosphere kept in the steam reformer unit 100 without forming a separate drain passage through which the condensed water is drained to the outside of the fuel processor 1a, such that the problem due to the condensed water does not occur.

The condensed water storage chamber 700 is disposed at the lower portion of the steam heating chamber 600. The reason why the condensed water storage chamber 700 is disposed at the lower portion of the steam heating chamber 600 is to store the condensed water which may be drained through the extending pipe 640 extending from the steam heating chamber 600 toward the steam reforming unit 160 and the condensed water storage chamber 700 is spaced apart from the lower end of the steam reforming unit 160 at a predetermined interval or more, such that a malfunction of the reaction catalyst due to the condensed water may be previously prevented.

The heat exchanger unit 200 has a cylindrical appearance and is a shell and tube type. Water which is a fluid moves to the tube and the heat exchange between the tube and the shell is made while the reformed gas relatively moves to each other in the shell.

The heat exchanger unit 200 includes an air inlet 220 configured to extend from an outer side of the heat exchanger unit 200 to an inner side thereof to be supplied with outer air so as to supply high temperature heating air to the burner unit 140; and an air outlet 240 configured to extend from the inner side of the heat exchanger unit 200 to the outer side thereof while being upwardly spaced apart from the air inlet 220 to supply the outer air introduced through the air inlet 220 to the burner unit 140 after the outer air is heat-exchanged with the steam.

The reformed gas moving to the heat exchanger unit 200 moves to the high temperature shift reforming unit 300 to be described below in the state in which temperature of initial reformed gas generated due to the high temperature steam in the foregoing steam reformer unit 100 is in a high temperature state of about 700□C. but falls to a temperature of 600□C. or less when the reformed gas passes through the heat exchanger unit 200, such that the temperature of the reformed gas may stably fall. Further, the temperature of the reformed gas is previously controlled to the temperature at which the reaction is stably maintained in the high temperature shift reforming unit 300 to be described below to improve the efficiency of the high temperature shift reforming unit 300.

The outer air is introduced into the air inlet 220 and then is supplied to the burner unit 140 through the air outlet 240 after the outer air is heat-exchanged with the high temperature reformed gas formed around the air inlet 220. The air supplied to the burner unit 140 is supplied to the burner unit 140 while being maintained at the relatively high temperature and thus has a high flash point, such that the combustion state may be stably maintained and thus the temperature of the steam reformer 160 may be maintained at an optimum temperature.

In particular, the heat exchanger unit 200 may lower the temperature of the exhaust gas generated from the burner unit 140 and the reformed gas generated after reaction in the steam reforming unit 160 to maintain the carbon monoxide included in the reformed gas supplied to the stack at a reference value or less, thereby performing the heat exchange as described above.

The high temperature shift reforming unit 300 performs the heat exchange so that the reformed gas maintained at a temperature state of 600□C. in the heat exchanger unit 200 is maintained at a temperature of about 350□C.

The diameter of the low temperature shift reforming unit 400 is larger than that of the high temperature shift reforming unit 300, but the thickness thereof is a relatively thin and the low temperature shift reforming unit 400 is supplied with the reformed gas passing through the high temperature shift reforming unit 300 to react with the pellet catalyst positioned therein.

As the thickness of the low temperature shift reforming unit 400 is thin, catalyst utilization is improved while a contact between the reformed gas and the pellet catalyst is mostly performed and the pellet catalyst amount is relatively reduced to improve economical efficiency.

Further, the reformed gas falls to a temperature of about 250□C. while passing through the low temperature shift reforming unit 400 and a carbon monoxide amount is also reduced to a range of 0.2% to 0.5%.

The heat exchange chamber 500 is separately formed at the lower end of the case 2 and includes the channel part 520, in which the channel part 520 includes a first channel part 520 supplied with a fluid, a second channel part 540 extending outwardly from a center of the casing 2 to drain the exhaust gas generated from the burner unit 140, and a third channel part 560 draining the reformed gas.

Based on the second channel part 540, the third channel part 560 is disposed in the state in which it adheres to the second channel part 540 and the first channel part 520 is disposed to enclose the second channel part 540 and the third channel part 560 from the outside, such that the exhaust gas and the reformed gas in the relatively high temperature state are drained in the heat exchanged state by the fluid supplied through the first channel part 520 or are supplied to the stack, thereby exchanging heat with heat energy included in waste heat.

When viewed from a cross-sectional view, the heat exchange chamber 500 has the structure of enclosing the reformed gas channel part 560 and therefore the temperature of the reformed gas is heat exchanged at the optimum temperature at which it may be supplied to the stack, thereby performing the optimum heat exchange at the limited size of the case Further, non-explained reference numerals are the same as the configuration of the first exemplary embodiment as described above, and therefore the detailed description thereof will be omitted.

According to the exemplary embodiments of the present invention, it is possible to make the equipment compact by relatively reducing the height of the fuel processor and improve the efficiency of the fuel process by shortening the warm up time for the reforming reaction and quickly increasing the temperature required for the reforming reaction.

According to the exemplary embodiments of the present invention, it is possible to stably supply the high temperature steam required for the reforming reaction by separately forming the space in which the high temperature steam supplied to the burner unit may be heated and improve the durability of the reforming catalyst by performing the heating using the high temperature steam without directly heating the reforming catalyst by flame.

According to the exemplary embodiments of the present invention, it is possible to improve the thermal efficiency by exchanging heat with the reformed gas through the heat exchanger unit.

Although the present invention was described above with reference to exemplary embodiments, it should be understood that the present invention may be changed and modified in various ways by those skilled in the art, without departing from the spirit and scope of the present invention described in claims.

What is claimed is:

1. A fuel processor, comprising:
   a steam reformer unit configured to be disposed at an upper portion in a casing;
   a heat exchanger unit configured to be disposed at a lower portion of the steam reformer unit;
   a high temperature shift reforming unit configured to be disposed at a lower portion of the heat exchanger unit;
   a low temperature shift reforming unit configured to be disposed while enclosing an outer portion of the high temperature shift reforming unit; and
   a heat exchange chamber configured to be disposed at a lower portion of the high temperature shift reforming unit and exchange heat between reformed gas and a heat exchange fluid supplied through a channel part formed to drain the reformed gas and combustion gas and supply the heat exchange fluid.

2. The fuel processor of claim 1, wherein the steam reformer unit includes:
   a burner housing configured to be inserted from a center of an upper portion of the casing and extending in a length direction;
   a burner unit configured to be installed at an upper portion in the burner housing and generating flame downward from the upper portion of the casing; and
   a steam reforming unit configured to form the burner housing as a concentric circle and has a reaction catalyst formed therein.

3. The fuel processor of claim 2, wherein the burner housing extends relatively shorter than a lower end of the steam reforming unit.

4. The fuel processor of claim 2, wherein the steam reforming unit has a thickness decreasing toward a radial direction of the casing.

5. The fuel processor of claim 2, wherein the steam reforming unit is formed between unit steam reforming units, respectively, in a length direction of the casing and is provided with a channel through which steam moves.

6. The fuel processor of claim 2, further comprising:
   a steam heating chamber configured to be disposed to face the lower portion of the steam reformer unit and be provided with an opening into which high temperature flame generated at the burner unit is introduced to stay steam heated by the burner unit therein for a predetermined time without directly moving the steam to the steam reforming unit after the steam is introduced through the opening.

7. The fuel processor of claim 6, wherein the steam heating chamber further includes an extending pipe configured to extend toward the steam reforming unit along a circumferential direction.

8. The fuel processor of claim 2, wherein the steam reformer unit further includes a condensed water storage chamber configured to store condensed water generated by exchanging heat with the steam supplied to the steam reforming unit.

9. The fuel processor of claim 6, wherein the condensed water storage chamber is disposed at a lower portion of the steam heating chamber.

10. The fuel processor of claim 1, wherein the heat exchanger unit includes:
   an air inlet configured to extend from an outer side of the heat exchanger unit to an inner side thereof to be supplied with outer air so as to supply high temperature heating air to the burner unit; and
   an air outlet configured to extend from the inner side of the heat exchanger unit to the outer side thereof while being upwardly spaced apart from the air inlet to supply the outer air introduced through the air inlet to the burner unit after the outer air is heat-exchanged with the steam.

11. The fuel processor of claim 10, wherein the heat exchanger unit is a shell and tube type.

12. The fuel processor of claim 10, wherein the reformed gas moving to the heat exchanger unit falls to a predetermined temperature by exchanging heat with the outer air supplied through the air inlet.

13. A fuel processor, comprising:
   a steam reformer unit configured to be disposed at an upper portion in a casing;
   a heat exchanger unit configured to be disposed at a lower portion of the steam reformer unit;
   a high temperature shift reforming unit configured to be disposed at a lower portion of the heat exchanger unit;
   a low temperature shift reforming unit configured to be disposed while enclosing an outer portion of the high temperature shift reforming unit;
   a heat exchange coil unit configured to be disposed between the high temperature shift reforming unit and the low temperature shift reforming unit and have a fluid for heat exchange supplied to an inside thereof to prevent the high temperature shift reforming unit from overheating; and
   a heat exchange chamber configured to be disposed at a lower portion of the high temperature shift reforming unit and exchange heat between reformed gas and a heat exchange fluid supplied through a channel part formed to drain the reformed gas and combustion gas and supply the heat exchange fluid.

14. The fuel processor of claim 13, wherein the heat exchange chamber encloses a reformed gas channel part through which the reformed gas moves.

\* \* \* \* \*